United States Patent
Liu et al.

(10) Patent No.: US 11,347,924 B1
(45) Date of Patent: May 31, 2022

(54) CHIP LAYOUT METHOD BASED ON MINIMUM TOTAL WIRE LENGTH

(71) Applicant: GUANGDONG UNIVERSITY OF TECHNOLOGY, Guangzhou (CN)

(72) Inventors: Qiang Liu, Guangzhou (CN); Lijun Wei, Guangzhou (CN); Xin Chen, Guangzhou (CN); Duxi Yan, Guangzhou (CN); Long Li, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/572,667

(22) Filed: Jan. 11, 2022

(30) Foreign Application Priority Data

Jun. 9, 2021 (CN) .......................... 202110644276.3

(51) Int. Cl.
*G06F 30/39* (2020.01)
*G06F 30/392* (2020.01)
*G06F 111/10* (2020.01)
*G06F 111/04* (2020.01)

(52) U.S. Cl.
CPC ........ *G06F 30/392* (2020.01); *G06F 2111/04* (2020.01); *G06F 2111/10* (2020.01)

(58) Field of Classification Search
CPC ...... G06F 30/39; G06F 30/392; G06F 30/394; G06F 30/398; G06F 2111/04; G06F 2111/10

USPC .................................................. 716/119, 123
See application file for complete search history.

(56) References Cited

U.S. PATENT DOCUMENTS

| | | | |
|---|---|---|---|
| 6,968,524 B2 | 11/2005 | Jiang et al. | |
| 8,024,673 B2 | 9/2011 | Nitta | |
| 8,560,992 B2 | 10/2013 | Wei et al. | |
| 2009/0187870 A1* | 7/2009 | Yifrach | G06F 30/392 |
| | | | 716/119 |

* cited by examiner

*Primary Examiner* — Paul Dinh
(74) *Attorney, Agent, or Firm* — True Shepherd LLC; Andrew C. Cheng

(57) ABSTRACT

A chip layout method based on a minimum total wire length, includes: initializing a total wire length to a preset value, initializing a number of iterations, randomly generating a sequence pair to represent a positional relationship between rectangular circuit modules, inputting the sequence pair to a model, and solving to obtain a sequence pair having a minimum wire length within the number of iterations; changing a field operator of the sequence pair to obtain a new one, inputting the new sequence pair to the model, retaining, if an obtained total wire length is less than the original total wire length, the new sequence pair, or otherwise, abandoning the new sequence pair; repeating the above operation till the number of iterations is reached; and outputting a minimum total wire length, and coordinates of each rectangular circuit module to obtain the chip layout based on the minimum total wire length.

4 Claims, 2 Drawing Sheets

| Positive subsequence pair | | Negative subsequence pair | | | | | |
|---|---|---|---|---|---|---|---|
| Position in the sequence pair | | | | Actual positional relationship between modules a and b | | | |
| Front | Back | Front | Back | Left | Right | Above | Below |
| a | b | a | b | a | b | / | / |
| b | a | b | a | b | a | / | / |
| a | b | b | a |   |   | a | b |
| b | a | a | b | / | / | b | a |

FIG. 2

CHIP LAYOUT METHOD BASED ON MINIMUM TOTAL WIRE LENGTH

CROSS-REFERENCE TO RELATED APPLICATIONS

This application claims priority to Chinese Patent Application No. 202110644276.3 with a filing date of Jun. 9, 2021. The content of the aforementioned application, including any intervening amendments thereto, is incorporated herein by reference.

TECHNICAL FIELD

The present disclosure relates to the technical field of chip layout, and in particular, to a chip layout method based on a minimum total wire length.

BACKGROUND ART

In very large-scale integration (VLSI) chip design, the minimum total wire length of the chip concerns how a variable-sized rectangular chip is determined by n rectangular circuit modules with given widths and heights, such that all rectangular circuit modules can be legitimately placed and the total length of wires between the circuit modules in the rectangular chip is minimum. The legitimacy means that all placed rectangular circuit modules fall within the boundary of the rectangular chip, with edges parallel to the edges of the rectangular chip and without the mutual overlap. The total wire length refers to a total length of wires through which the rectangular circuit modules are connected from pins thereon.

The minimization of the total wire length on the chip is crucial for the VLSI chip design. The VLSI chip design involves the placement of a set of rectangular modules on the rectangular chip and wire connection of these modules. In this case, the goals to be considered are minimization for the area of the rectangular chip and minimization for the total length of the wires. As is known to all, the performance of the chip is the first and foremost goal to be considered and optimized during the VLSI chip design, and the lengths of interconnecting wires are main factors to determine the power dissipation, delay, reliability and other performance of the chip. On the other hand, materials for producing the chip are very expensive, so the minimization of the total wire length can be helpful to save the metal wires and reduce the manufacturing cost; and particularly in large-scale production, improving the utilization rates of chip materials can bring the remarkable economic benefits.

However, most existing algorithms applied to the VLSI chip design attach importance to optimization of a total area of the chip, while ignoring the interconnecting wires between the rectangular circuit modules, such that the power dissipation and delay of the chip cannot be reduced. Concerning minimization of the wire length on the VLSI chip, existing methods are to simply connect the rectangular circuit modules through their respective centers, and thus the results are too simple to be representative and address the practical problems well.

In view of the minimization of the total wire length on the chip, the present disclosure provides a chip arrangement method based on a minimum wire length. The method can achieve the utmost performance of the integration chip and the reasonable chip layout by minimizing the total wire length of the chip during the VLSI chip design; and furthermore, the present disclosure can save materials for producing the rectangular chip at maximum, improve the utilization rates of the materials, and bring remarkable economic benefits to enterprises in large-scale production. The present disclosure is superior to the existing methods, with improved solutions for most typical cases.

SUMMARY

In view of the defects in the background art, an objective of the present disclosure is to provide a chip arrangement method based on a minimum total wire length. The method can achieve the utmost performance of the integration chip and the reasonable chip layout by minimizing the total wire length of the chip during the VLSI chip design; and furthermore, the present disclosure can save materials for producing the rectangular chip at maximum, improve the utilization rates of the materials, and bring remarkable economic benefits in large-scale production.

In order to achieve the above objective, the present disclosure adopts the following technical solutions:

A chip layout method based on a minimum total wire length includes the following steps:

step A: initializing a total wire length of a chip to a maximum preset wire length, and initializing a number of iterations;

step B: randomly generating a sequence pair, the sequence pair being used to represent a positional relationship between rectangular circuit modules, inputting the sequence pair to a model, and solving to obtain a minimum total wire length and a corresponding present sequence pair at a present number of iterations;

step C: changing a field operator of the present sequence pair to obtain a new sequence pair, inputting the new sequence pair to the original model, and solving to obtain a new sequence pair and a total wire length corresponding to the new sequence pair;

step D: determining whether the total wire length corresponding to the new sequence pair is less than the total wire length corresponding to the present sequence pair, and if no, deleting the new sequence pair, retaining the present sequence pair, and repeating step C; and if yes, deleting the present sequence pair, retaining the new sequence pair and labeling the new sequence pair as the present sequence pair; and step E: determining whether a number of iterations changed by the field operator is reached, and if yes, outputting the total wire length corresponding to the present sequence pair and a coordinate position of each of the rectangular circuit modules, the total wire length being a minimum total wire length; and if no, repeating step C.

Preferably, step B may further include: determining pin coordinate information of the rectangular circuit modules based on the rectangular circuit modules, and gathering the pin coordinate information of the rectangular modules to generate pin network sets;

randomly generating a sequence pair, and representing the positional relationship between the rectangular circuit modules with the sequence pair; and inputting the sequence pair, the rectangular circuit modules, the pin coordinate information and the pin network sets to the original model and solving to obtain a present sequence pair corresponding to a minimum total wire length at a present number of iterations.

Preferably, the sequence pair may be used to represent the positional relationship between the rectangular circuit modules, specifically including:

the positional relationship between the rectangular circuit modules may be represented based on positive and negative subsequence pairs;

if a present rectangular circuit module has a sequence position in front of another rectangular circuit module in the positive and negative subsequence pairs, the present rectangular circuit module may be actually located on a left side of the another rectangular circuit module;

if the present rectangular circuit module has a sequence position in back of the another rectangular circuit module in the positive and negative subsequence pairs, the present rectangular circuit module may be actually located on a right side of the another rectangular circuit module;

if the present rectangular circuit module has a sequence position in front of the another rectangular circuit module in the positive subsequence pair, and has a sequence position in back of the another rectangular circuit module in the negative subsequence pair, the present rectangular circuit module may be actually located above the another rectangular circuit module; and if the present rectangular circuit module has a sequence position in back of the another rectangular circuit module in the positive subsequence pair, and has a sequence position in front of the another rectangular circuit module in the negative subsequence pair, the present rectangular circuit module may be actually located below the another rectangular circuit module.

Preferably, step B may further include:

step B1: randomly generating a sequence pair, inputting the sequence pair, the rectangular circuit modules, the pin coordinate information and the pin network sets to the model, and solving to obtain a new sequence pair and a total wide length corresponding to the new sequence pair;

step B2: determining whether the total wide length corresponding to the new sequence pair is less than a total wire length corresponding to an original sequence pair, and if yes, retaining the total wide length corresponding to the new sequence pair, replacing the original sequence pair with the new sequence pair, and jumping to step B3; and if no, repeating step B1; and step B3: determining whether a number of iterations is reached, and if yes, outputting the sequence pair and the total wire length corresponding to the new sequence pair in step B2; and if no, repeating step B1.

Preferably, the original model may include:

min $\Sigma_{N \in \mathcal{N}} w(N) \cdot (x_N^+ - x_N^- + y_N^+ - y_N^-)$;

$\forall N \in \mathcal{N}$, $p \in N$, $i(p) \neq \emptyset$;

$x_{i(p)} - x_N^- \geq -x(p)$;

$y_{i(p)} - y_N^- \geq -y(p)$;

$x_N^+ - x_{i(p)} \geq x(p)$;

$y_N^+ - y_{i(p)} \geq y(p)$;

$\forall N \in \mathcal{N}$, $p \in N$, $i(p) \neq \emptyset$;

$t_0 - x_N^- \geq -x(p)$;

$t_0 - y_N^- \geq -y(p)$;

$x_N^+ - t_0 \geq x(p)$;

$y_N^+ - t_0 \geq y(p)$;

$\forall r_i \in R$, $r_i \neq r_j$;

$t_0 - x_i \geq w_i - W$, $t_0 - y_i \geq h_i - H$;

$y_i - y_j \geq h_j + k_{ij}$, $y_j - y_i \geq h_i + k_{ij}$; and $x_i - x_j \geq w_j + d_{ij}$, $x_j - x_i \geq w_i + d_{ij}$, where:

N represents a pin network;

w(N) represents a weight of the pin network;

$\mathcal{N}$ represents pin network sets;

$x_N^+$, $x_N^-$, $y_N^+$, $y_N^-$ represents four decision variables, the four decision variables being formed into a minimum-cycle long-axis parallel rectangle of each network N $[x_N^+ - x_N^-] \times [y_N^+ - y_N^-]$;

p represents a pin;

$x_{i(p)}$, $y_{i(p)}$ represents a transverse coordinate and a longitudinal coordinate of a rectangular circuit module $r_i$ where the pin p is located;

$x_{(p)}$, $y_{(p)}$ represents offsets of the pin p relative to the coordinates of the located rectangular circuit module;

$t_0$ represents a constant;

$r_i$ represents the rectangular circuit module;

R represents a set of all rectangular circuit modules;

$x_i$, $y_i$ represents the transverse coordinate and the longitudinal coordinate of the rectangular circuit module $r_i$;

$x_j$, $y_j$ represents a transverse coordinate and a longitudinal coordinate of a rectangular circuit module $r_j$;

$k_{ij}$ represents a wiring distance between the rectangular circuit modules $r_i$, $r_j$ in a vertical direction;

$d_{ij}$ represents a wiring distance between the rectangular circuit modules $r_i$, $r_j$ in a horizontal direction;

W represents a width of a region where all rectangular circuit modules are placed, and H represents a height of the region where all rectangular circuit modules are placed;

$w_i$ and $h_i$ represent a height and a width of the rectangular circuit module $r_i$; and $w_j$ and $h_j$ represent a height and a width of the rectangular circuit module $r_j$.

Preferably, the chip layout method may include: converting the original model into a dual model to obtain a new sequence pair and a total wire length corresponding to the new sequence pair, where the dual model may include:

$$\forall j: \sum_i f_{ij} - \sum_k f_{jk} = \begin{cases} -w(N), & v_j \in \{x(N)^-, y(N)^-\} \\ w(N), & v_j \in \{x(N)^+, y(N)^+\} \\ 0, & \text{otherwise} \end{cases} \text{; and}$$

max$\Sigma b_{ij} f_{ij}$, where:

$b_{ij}$ represents a right-hand side of a constraint of the original model;

$f_{ij}$ represents a dual variable corresponding to a constraint $v_j - v_i \geq b_{ij}$ of the original model;

$f_{jk}$ represents a dual variable corresponding to a constraint $v_k - v_j \geq b_{jk}$ of the original model; and $v_j$, $v_i$, $v_k$ represents types of variables in the original model, the types of the variables in the original model including:

$x_N^+$, $y_N^+$, $x_N^-$, $y_N^-$, $x_i$, $y_i$, $x_{i(p)}$, $y_{i(p)}$, where $x(N)^-$, $y(N)^-$ represents $x_N^-$, $y_N^-$ in the original model, and $x(N)^+$, $y(N)^+$ represents $x_N^+$, $y_N^+$ in the original model.

The present disclosure achieves the following technical effects over the prior art:

The present disclosure implements the chip layout by minimizing the total length of interconnecting wires, and achieves the better performance of the chip. With the minimum total wire length, the method further achieves a better chip layout (the rectangular circuit modules on the chip are arranged compactly as much as possible to reduce the total area of the chip to some extent). Compared with existing methods, the present disclosure is implemented more simply and easily; and by converting the problem model into the dual model, the method is equivalent to a maximum-cost flow problem, such that the problem is solved within polynomial time to improve the efficiency.

BRIEF DESCRIPTION OF THE DRAWINGS

FIG. 2 illustrates a positional relationship between rectangular circuit modules a and b in a sequence pair according to an embodiment of the present disclosure.

DETAILED DESCRIPTION OF THE EMBODIMENTS

Figure 1:
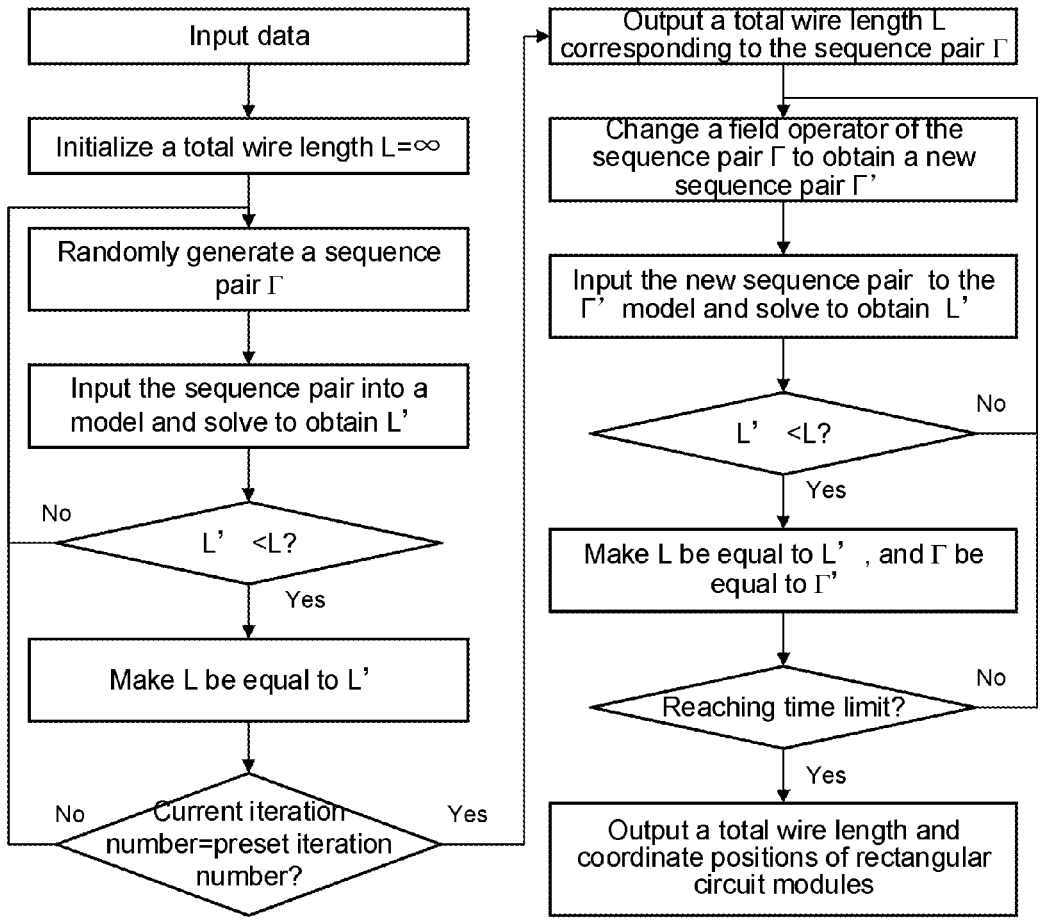
FIG. 1 illustrates a flow chart of a chip layout method based on a minimum total wire length according to an embodiment of the present disclosure.

The technical solutions of the present disclosure will be described in more detail below with reference to the accompanying drawings and specific implementations.

Most existing technologies applied to the VLSI chip design attach importance to optimization of a total area of the chip, while ignoring the interconnecting wires between the rectangular circuit modules, such that the power dissipation and delay of the chip cannot be reduced. Concerning minimization of the wire length on the VLSI chip, existing methods are to simply connect the rectangular circuit modules through their respective centers, and the obtained results are too simple to be representative and address the practical problems well. In view of the above problems, the present disclosure provides a chip layout method based on a minimum total wire length. The method is implemented by initializing a total wire length to a very large number, controlling a number of iterations, continuously and randomly generating a sequence pair to represent a positional relationship between rectangular circuit modules, inputting the sequence pair to a model, and solving to obtain a sequence pair having a minimum wire length at a present number of iterations; changing a field operator of the sequence pair to obtain a new sequence pair, inputting the new sequence pair to the model, retaining, if an obtained total wire length is less than the original total wire length, the new sequence pair obtained by changing the field operator, or otherwise, abandoning the new sequence pair; repeating the above operation till a number of iterations changed by the field operator is reached; and outputting a minimum total wire length, and a coordinate of each of the rectangular circuit modules to obtain the chip layout based on the minimum total wire length.

As shown in FIG. 1, L represents a present total wire length, L' represents a total wire length which is sought first, $\Gamma$ represents a present randomly generated sequence pair, and $\Gamma$' represents a sought sequence pair. Specifically, the chip layout method includes the following steps:

Step A: Initialize a total wire length of a chip to a maximum preset wire length, and initialize a number of iterations.

Step B: Randomly generate a sequence pair, the sequence pair being used to represent a positional relationship between rectangular circuit modules, input the sequence pair to a model, and solve to obtain a present sequence pair corresponding to a minimum total wire length at a present number of iterations.

Preferably, the step includes: Determine pin coordinate information of the rectangular circuit modules based on the rectangular circuit modules, and gather the pin coordinate information of the rectangular modules to generate pin network sets.

Randomly generate a sequence pair, and represent the positional relationship between the rectangular circuit modules with the sequence pair.

Input the sequence pair, the rectangular circuit modules, the pin coordinate information and the pin network sets to the original model and solve to obtain a present sequence pair corresponding to a minimum total wire length at a present number of iterations.

Preferably, the sequence pair is used to represent the positional relationship between the rectangular circuit modules, specifically including:

The positional relationship between the rectangular circuit modules is represented based on positive and negative subsequence pairs.

If a present rectangular circuit module has a sequence position in front of another rectangular circuit module in the positive and negative subsequence pairs, the present rectangular circuit module is actually located on a left side of the another rectangular circuit module.

If the present rectangular circuit module has a sequence position in back of the another rectangular circuit module in the positive and negative subsequence pairs, the present rectangular circuit module is actually located on a right side of the another rectangular circuit module.

If the present rectangular circuit module has a sequence position in front of the another rectangular circuit module in the positive subsequence pair, and has a sequence position in back of the another rectangular circuit module in the negative subsequence pair, the present rectangular circuit module is actually located above the another rectangular circuit module.

If the present rectangular circuit module has a sequence position in back of the another rectangular circuit module in the positive subsequence pair, and has a sequence position in front of the another rectangular circuit module in the negative subsequence pair, the present rectangular circuit module is actually located below the another rectangular circuit module.

As shown in FIG. 2, the present disclosure takes rectangular circuit modules a and b as an example to describe the comparison between two modules. Given two modules a and b, a is located on the left side of b if a is in front of b in the positive and negative sequences; a is located on the right side of b if a is in back of b in the positive and negative sequences; a is located above b if a is in front of b in the positive sequence but in back of b in the negative sequence; and a is located below b if a is in back of b in the positive sequence but in front of b in the negative sequence. With the sequence pair $(\Gamma_+, \Gamma_-)=(124,214)$ for example, 1 is in front of 4 in the positive and negative sequences, indicating that 1 is located on the left side of 4; 1 is in front of 2 in the positive sequence but in back of 2 in the negative sequence, indicating that 1 is located above 2; and 2 is in front of 4 in the positive and negative sequences, indicating that 2 is located on the left side of 4. The above are the positional relationship between the three modules represented by the sequence pair $(\Gamma_+, \Gamma_-)=(124,214)$.

Preferably, Step B further includes:

Step B1: Randomly generate a sequence pair, input the sequence pair, the rectangular circuit modules, the pin coordinate information and the pin network sets to the model, and solve to obtain a new sequence pair and a total wide length corresponding to the new sequence pair.

Step B2: Determine whether the total wide length corresponding to the new sequence pair is less than a total wire length corresponding to an original sequence pair, and if yes, retain the total wide length corresponding to the new sequence pair, replace the original sequence pair with the new sequence pair, and jump to Step B3; and if no, repeat Step B1.

Step B3: Determine whether a number of iterations is reached, and if yes, output the sequence pair and the total wire length corresponding to the new sequence pair in Step B2; and if no, repeat Step B1.

Step C: Change a field operator of the present sequence pair to obtain a new sequence pair, input the new sequence pair to the original model, and solve to obtain a total wire length corresponding to the new sequence pair.

Step D: Determine whether the total wire length corresponding to the new sequence pair is less than the total wire length corresponding to the present sequence pair, and if no, delete the new sequence pair, retain the present sequence pair, and repeat Step C; and if yes, delete the present sequence pair, retain the new sequence pair and label the new sequence pair as the present sequence pair.

Step E: Determine whether a number of iterations changed by the field operator is reached, and if yes, output the total wire length corresponding to the present sequence pair and a coordinate position of each of the rectangular circuit modules, the total wire length being a minimum total wire length; and if no, repeat Step C.

Preferably, the original model includes:
min $\Sigma_{N \in \mathcal{N}} w(N) \cdot (x_N^+ - x_N^- + y_N^+ - y_N^-)$;
$\forall N \in \mathcal{N}$, $p \in N$, $i(p) \neq \emptyset$;
$x_{i(p)} - x_N^- \geq -x(p)$;
$y_{i(p)} - y_N^- \geq -y(p)$;
$x_N^+ - x_{i(p)} \geq x(p)$;
$y_N^+ - y_{i(p)} \geq y(p)$;
$\forall N \in \mathcal{N}$, $p \in N$, $i(p) \neq \emptyset$;
$t_0 - x_N^- \geq -x(p)$;
$t_0 - y_N^- \geq -y(p)$;
$x_N^+ - t_0 \geq x(p)$;
$y_N^+ - t_0 \geq y(p)$;
$\forall r_i \in R$, $r_i \neq r_j$;
$t_0 - x_i \geq w_i - W$, $t_0 - y_i \geq h_i - H$;
$y_i - y_j \geq h_j + k_{ij}$, $y_j - y_i \geq h_i + k_{ij}$; and
$x_i - x_j \geq w_j + d_{ij}$, $x_j - x_i \geq w_i + d_{ij}$,
where:
N represents a pin network;
w(N) represents a weight of the pin network;
$\mathcal{N}$ represents pin network sets;
$x_N^+, x_N^-, y_N^+, y_N^-$ represents four decision variables, the four decision variables being formed into a minimum-cycle long-axis parallel rectangle of each network N $[x_N^+ - x_N^-] \times [y_N^+ - y_N^-]$;
p represents a pin;
$x_{i(p)}, y_{i(p)}$ represents a transverse coordinate and a longitudinal coordinate of a rectangular circuit module $r_i$ where the pin p is located;
$x_{(p)}, y_{(p)}$ represents offsets of the pin p relative to the coordinates of the located rectangular circuit module;
$t_0$ represents a constant;
$r_i$ represents the rectangular circuit module;
R represents a set of all rectangular circuit modules;
$x_i, y_i$ represents the transverse coordinate and the longitudinal coordinate of a rectangular circuit module $r_i$;
$x_j, y_j$ represents a transverse coordinate and a longitudinal coordinate of the rectangular circuit module $r_j$;
$k_{ij}$ represents a wiring distance between the rectangular circuit modules $r_i$, $r_j$ in a vertical direction;
$d_{ij}$ represents a wiring distance between the rectangular circuit modules $r_i$, $r_j$ in a horizontal direction;

W represents a width of a region where all rectangular circuit modules are placed, and H represents a height of the region where all rectangular circuit modules are placed;
$w_i$ and $h_i$ represent a height and a width of the rectangular circuit module $r_i$; and
$w_j$ and $h_j$ represent a height and a width of the rectangular circuit module $r_j$.

Preferably, the chip layout method includes: Convert the original model into a dual model to obtain a new sequence pair and a total wire length corresponding to the new sequence pair, where
the dual model includes:

$$\forall j: \sum_i f_{ij} - \sum_k f_{jk} = \begin{cases} -w(N), & v_j \in \{x(N)^-, y(N)^-\} \\ w(N), & v_j \in \{x(N)^+, y(N)^+\} \\ 0, & \text{otherwise} \end{cases} ; \text{and}$$

$\max \Sigma b_{ij} f_{ij}$;
where:
$b_{ij}$ represents a right-hand side of a constraint of the original model;
$f_{ij}$ represents a dual variable corresponding to a constraint $v_j - v_i \geq b_{ij}$ of the original model;
$f_{jk}$ represents a dual variable corresponding to a constraint $v_k - v_j \geq b_{jk}$ of the original model;
$v_j$, $v_i$, $v_k$ represents types of variables in the original model, the types of the variables in the original model including:
$x_N^+, x_N^-, y_N^+, y_N^-, x_i, y_i, x_{i(p)}, y_{i(p)}$, where $x(N)^-$, $y(N)^-$ represents $x_N^-$, $y_N^-$ in the original model, and $x(N)^+$, $y(N)^+$ represents $x_N^+$, $y_N^+$ in the original model.

The technical principles of the present disclosure are described above with reference to the specific embodiments. These descriptions are merely intended to explain the principles of the present disclosure, and may not be construed as limiting the protection scope of the present disclosure in any way. Therefore, those skilled in the art may derive other specific implementations of the present disclosure without creative effort, but these implementations should fall within the protection scope of the present disclosure.

What is claimed is:
1. A chip layout method based on a minimum total wire length, comprising the following steps:
step A: initializing a total wire length of a chip to a maximum preset wire length, and initializing a number of iterations;
step B: randomly generating a sequence pair, the sequence pair being used to represent a positional relationship between rectangular circuit modules, inputting the sequence pair to an original model, and solving to obtain a minimum total wire length and a corresponding present sequence pair at a present number of iterations;
step C: changing a field operator of the present sequence pair to obtain a new sequence pair, inputting the new sequence pair to the original model, and solving to obtain a new sequence pair and a total wire length corresponding to the new sequence pair;
step D: determining whether the total wire length corresponding to the new sequence pair is less than the total wire length corresponding to the present sequence pair, and if no, deleting the new sequence pair, retaining the present sequence pair, and repeating step C; and if yes, deleting the present sequence pair, retaining the new sequence pair and labeling the new sequence pair as the present sequence pair; and step E: determining whether a number of iterations changed by the field operator is reached, and if yes, outputting the total wire length corresponding to the present sequence pair and a coordinate position of each of the rectangular circuit modules, the total wire length being a minimum total wire length; and if no, repeating step C, wherein the original model in step C comprises:
min $\Sigma_{N\in\mathcal{N}} w(N)\cdot(x_N^+ - x_N^- + y_N^+ - y_N^-)$;
$\forall N \in \mathcal{N}$, $p \in N$, $i(p) \neq \emptyset$;
$x_{i(p)} - x_N^- \geq -x(p)$;
$y_{i(p)} - y_N^- \geq -y(p)$;
$x_N^+ - x_{i(p)} \geq x(p)$;
$y_N^+ - y_{i(p)} \geq y(p)$;
$\forall N \in \mathcal{N}$, $p \in N$, $i(p) \neq \emptyset$;
$t_0 - x_N^- \geq -x(p)$;
$t_0 - y_N^- \geq -y(p)$;
$x_N^+ - t_0 \geq x(p)$;
$y_N^+ - t_0 \geq y(p)$;
$\forall r_i \in R$, $r_i \neq r_j$;
$t_0 - x_i \geq w_i - W$, $t_0 - y_i \geq h_i - H$;
$y_i - y_j \geq h_j + k_{ij}$, $-y_i \geq h_i + k_{ij}$; and
$x_i - x_j \geq w_j + d_{ij}$, $x_j - x_i \geq w_i + d_{ij}$,
wherein:
N represents a pin network;
w(N) represents a weight of the pin network;
$\mathcal{N}$ represents pin network sets;
$x_N^+$, $x_N^-$, $y_N^+$, and $y_N^-$ represent four decision variables respectively, and the four decision variables are formed into a minimum-cycle long-axis parallel rectangle of the pin network N $[x_N^+ - x_N^-] \times [y_N^+ - y_N^-]$;
p represents a pin;
$x_{i(p)}$, and $y_{i(p)}$ respectively represent a transverse coordinate and a longitudinal coordinate of a rectangular circuit module $r_i$ where the pin p is located;
$x_{(p)}$, and $y_{(p)}$ represent offsets of the pin p relative to the coordinates of the located rectangular circuit module;
$t_0$ represents a constant;
$r_i$ represents the rectangular circuit module;
R represents a set of all rectangular circuit modules;
$x_i$, and $y_i$ respectively represent the transverse coordinate and the longitudinal coordinate of the rectangular circuit module $r_i$;
$x_j$, and $y_j$ respectively represent a transverse coordinate and a longitudinal coordinate of a rectangular circuit module $r_j$;
$k_{ij}$ represents a wiring distance between the rectangular circuit modules $r_i$, $r_j$ in a vertical direction;
$d_{ij}$ represents a wiring distance between the rectangular circuit modules $r_i$, $r_j$ in a horizontal direction;
W represents a width of a region where all rectangular circuit modules are placed, and H represents a height of the region where all rectangular circuit modules are placed;
$w_i$ and $h_i$ respectively represent a height and a width of the rectangular circuit module $r_i$; and
$w_j$ and $h_j$ respectively represent a height and a width of the rectangular circuit module $r_j$; and
the chip layout method further comprises: converting the original model into a dual model to obtain a new sequence pair and a total wire length corresponding to the new sequence pair, wherein the dual model comprises:

$$\forall j: \sum_i f_{ij} - \sum_k f_{jk} = \begin{cases} -w(N), & v_j \in \{x(N)^-, y(N)^-\} \\ w(N), & v_j \in \{x(N)^+, y(N)^+\} \\ 0, & \text{otherwise} \end{cases} ; \text{and}$$

$$\max \sum b_{ij} f_{ij},$$

max$\Sigma b_{ij} f_{ij}$,
wherein:
$b_{ij}$ represents a right-hand side of a constraint of the original model;
$f_{ij}$ represents a dual variable corresponding to a constraint $v_j - v_i \geq b_{ij}$ of the original model;
$f_{jk}$ represents a dual variable corresponding to a constraint $v_k - v_j \geq b_{jk}$ of the original model; and
$v_j$, $v_i$, and $v_k$ represent types of variables in the original model, the types of the variables in the original model comprising:
$x_N^+$, $y_N^+$, $x_N^-$, $y_N^-$, $x_i$, $y_i$, $x_{i(p)}$, $y_{i(p)}$, where $x(N)^-$, $y(N)^-$ respectively represents $x_N^-$, $y_N^-$ in the original model, and $x(N)^+$, $y(N)^+$ respectively represents $x_N^+$, $y_N^+$ in the original model.

2. The chip layout method according to claim 1, wherein step B further comprises: determining pin coordinate information of the rectangular circuit modules based on the rectangular circuit modules, and gathering the pin coordinate information of the rectangular modules to generate the pin network sets;
randomly generating a sequence pair, and representing the positional relationship between the rectangular circuit modules with the sequence pair; and
inputting the sequence pair, the rectangular circuit modules, the pin coordinate information, the pin network sets and a wiring distance between the rectangular circuit modules to the original model and solving to obtain a present sequence pair corresponding to a minimum total wire length at a present number of iterations.

3. The chip layout method according to claim 1, wherein the sequence pair representing the positional relationship between the rectangular circuit modules, specifically comprises:
the positional relationship between the rectangular circuit modules is represented based on positive and negative subsequence pairs;
if a present rectangular circuit module has a sequence position in front of another rectangular circuit module in positive and negative subsequence pairs, the present rectangular circuit module is actually located on a left side of the another rectangular circuit module;
if the present rectangular circuit module has a sequence position in back of the another rectangular circuit module in the positive and negative subsequence pairs, the present rectangular circuit module is actually located on a right side of the another rectangular circuit module;
if the present rectangular circuit module has a sequence position in front of the another rectangular circuit module in the positive subsequence pair, and has a sequence position in back of the another rectangular circuit module in the negative subsequence pair, the present rectangular circuit module is actually located above the another rectangular circuit module; and
if the present rectangular circuit module has a sequence position in back of the another rectangular circuit module in the positive subsequence pair, and has a sequence position in front of the another rectangular circuit module in the negative subsequence pair, the present rectangular circuit module is actually located below the another rectangular circuit module.

4. The chip layout method according to claim 2, wherein step B further comprises:

step B1: randomly generating a sequence pair, inputting the sequence pair, the rectangular circuit modules, the pin coordinate information and the pin network sets to the original model, and solving to obtain a new sequence pair and a total wide length corresponding to the new sequence pair;

step B2: determining whether the total wide length corresponding to the new sequence pair is less than a total wire length corresponding to the present sequence pair, and if yes, retaining the total wide length corresponding to the new sequence pair, replacing the present sequence pair with the new sequence pair, and jumping to step B3; and if no, repeating step B1; and step B3: determining whether a number of iterations is reached, and if yes, outputting the sequence pair and the total wire length corresponding to the new sequence pair in step B2; and if no, repeating step B1.

* * * * *